(12) United States Patent
Bamberger et al.

(10) Patent No.: US 10,208,804 B2
(45) Date of Patent: Feb. 19, 2019

(54) CONTROL DEVICE

(71) Applicant: BELIMO HOLDING AG, Hinwil (CH)

(72) Inventors: Georg Bamberger, Winterthur (CH); Urs Niederhauser, Pfungen (CH)

(73) Assignee: BELIMO HOLDING AG, Hinwil (CH)

( * ) Notice: Subject to any disclaimer, the term of this patent is extended or adjusted under 35 U.S.C. 154(b) by 92 days.

(21) Appl. No.: 15/526,825

(22) PCT Filed: Nov. 16, 2015

(86) PCT No.: PCT/EP2015/076691
§ 371 (c)(1),
(2) Date: May 15, 2017

(87) PCT Pub. No.: WO2016/096275
PCT Pub. Date: Jun. 23, 2016

(65) Prior Publication Data
US 2017/0328413 A1 Nov. 16, 2017

(30) Foreign Application Priority Data
Dec. 15, 2014 (CH) ..................................... 01933/14

(51) Int. Cl.
*F16D 1/033* (2006.01)
*F16D 1/076* (2006.01)
(Continued)

(52) U.S. Cl.
CPC ............. *F16D 1/033* (2013.01); *F16D 1/076* (2013.01); *F16K 1/221* (2013.01); *F16K 31/041* (2013.01);
(Continued)

(58) Field of Classification Search
CPC ........ F16D 1/033; F16D 1/076; F16K 31/042; F16K 1/221; F16K 31/535; F16K 31/041;
(Continued)

(56) References Cited

U.S. PATENT DOCUMENTS 3,782,226 A * 1/1974 Boyd ...................... B23B 29/32
74/826
3,821,984 A * 7/1974 Lee ........................ E21B 33/047
251/292

(Continued)

FOREIGN PATENT DOCUMENTS

DE 202 07 519 U1 7/2002
DE 102012020067 A1 * 4/2014
(Continued)

OTHER PUBLICATIONS

International Search Report for PCT/EP2015/076691 dated Jan. 25, 2016.

*Primary Examiner* — John Bastianelli
(74) *Attorney, Agent, or Firm* — Sughrue Mion, PLLC

(57) ABSTRACT

A control device (10') comprises a control unit (10') with a control element for controlling a fluid flow and being rotatable about a first axis (13) between an open position and a closed position, and a separate motor-driven actuator unit (24), which is mechanically coupled to said control unit (10') to rotate said control element about said first axis (13) in a controllable fashion, whereby said actuator unit (24) comprises a driving part (25) with a driving element (31) being rotatable about a second axis (26), to be mechanically coupled to said control element in a coupling position to rotate said control element about said first axis (13), and a control part (28) for driving said driving element (31) in a controllable fashion. Said driving element (31) is removably coupled to said control unit (10') by means of a spur gearing (Hirth serration) (22, 29).

14 Claims, 4 Drawing Sheets

(51) Int. Cl.
*F16K 31/53* (2006.01)
*F24F 13/14* (2006.01)
*F16K 1/22* (2006.01)
*F16K 31/04* (2006.01)

(52) U.S. Cl.
CPC .......... *F16K 31/042* (2013.01); *F16K 31/535* (2013.01); *F24F 13/1426* (2013.01); *F24F 13/1486* (2013.01); *F24F 2013/1433* (2013.01); *F24F 2013/1446* (2013.01)

(58) Field of Classification Search
CPC ............... F24F 13/1486; F24F 13/1426; F24F 2013/1446; F24F 2013/1433
USPC ............. 251/291–292, 250.5, 248, 305–308; 74/813 R, 813 L
See application file for complete search history.

(56) References Cited

U.S. PATENT DOCUMENTS

| | | | | |
|---|---|---|---|---|
| 4,135,838 A | * | 1/1979 | Vandenberg | F16K 31/54 251/292 |
| 4,353,271 A | * | 10/1982 | Pieczulewski | B23Q 16/102 74/813 L |
| 5,967,171 A | * | 10/1999 | Dwyer, Jr. | D06F 39/081 251/292 |
| 6,240,807 B1 | * | 6/2001 | Hebener | B23Q 16/10 74/813 L |
| 6,880,806 B2 | * | 4/2005 | Haikawa | F16K 31/041 251/292 |
| 8,061,684 B2 | * | 11/2011 | Lehnert | F16K 1/221 251/292 |
| 8,931,759 B2 | * | 1/2015 | Bonanno | F16K 31/041 251/308 |
| 2004/0026175 A1 | | 2/2004 | Oh et al. | |
| 2005/0287947 A1 | | 12/2005 | Ulicny et al. | |
| 2007/0071545 A1 | * | 3/2007 | Schenk | F01D 5/025 403/28 |
| 2007/0163674 A1 | * | 7/2007 | Kustner | F16D 1/076 144/194 |
| 2010/0144452 A1 | * | 6/2010 | Muenich | F16D 3/04 464/105 |
| 2010/0253270 A1 | * | 10/2010 | Kuster | G05B 19/402 318/452 |

FOREIGN PATENT DOCUMENTS

| | | |
|---|---|---|
| EP | 1 347 249 A1 | 9/2003 |
| WO | WO 2005/090831 A1 * | 9/2005 |
| WO | 2008/028503 A1 | 3/2008 |
| WO | WO 2012/087659 A2 * | 6/2012 |

* cited by examiner

CONTROL DEVICE

BACKGROUND OF THE INVENTION

The present invention relates to the technology of motor-driven control devices, as they are for example used in HVAC applications. It refers to a control device.

PRIOR ART

Air dampers or valves to control airflow or heating and cooling fluids in HVAC applications, are well known in the art.

Document US 2010/0253270 A1 discloses an actuator, which comprises an electrical motor for driving a damper from a rest position to a stalled position. The damper is biased toward the rest position with at least one spring. A control module is configured to supply, upon activation of the actuator, a drive current to the electrical motor for driving the damper from the rest position to the stalled position against a bias force produced by the spring.

Document WO 2005/090831 A1 relates to reduction gearing for an electrically driven actuator for controlling a gaseous or liquid volumetric flow, in particular in the fields of heating, ventilation and air conditioning technology and fire and smoke protection, said reduction gearing being modular.

Document WO 2012/087659 A2 discloses an over shaft rotary actuator with an internal clamp arrangement. The actuator includes an internal clamp arrangement carried within a housing. A drive train and a motor also carried within the housing and mechanically coupled to the internal clamp arrangement. The internal clamp arrangement is centered on the plane that a driving torque is applied to the internal clamp arrangement to rotate a shaft.

Document WO 2014/093306 A1 relates to an actuator assembly, which includes a housing, and a clamp disposed within the housing. The clamp is configured to attach the actuator assembly to a damper jackshaft or valve stem or valve linkage shaft. The jackshaft is operable to control the position of one or more damper blades. The valve stem and valve linkage shaft control the position of the valve plug. The clamp is accessible via a slotted opening which is unobstructed at one end. A motor is configured to rotate the clamping device within the housing. A control module is coupled to the motor and configured to control the damper or valve actuator assembly. In embodiments, a communications module facilitates communications to and from the damper actuator assembly over a network, and allows both remote monitoring of the damper and remote control of the damper actuator assembly or of the valve and remote control of the valve actuator assembly.

DE 102012020067 A1 discloses an actuator, which has a spindle nut axially movable toward opening and closed positions by an adjusting cylinder i.e. pneumatic cylinder. The spindle nut is meshed with a spindle and axially movable together with the spindle nut. The spindle nut is urged toward the closed position by spring force of a restoring spring. The spindle is drivable though a drive shaft i.e. sleeve shaft, of a drive motor i.e. electric motor. Clutches make the spindle to be in operative engagement at a certain stroke with the drive shaft. A clutch comprises two Hirth serrations.

When such a control device comprises a control unit and an actuator unit, the interface between actuator unit and control unit (damper, valve, or the like) comprises a square drive shaft using form-locking features with backlash. The actuator unit is inserted and tightened axially.

Then a clamp bracket is attached by means of traction axle and actuator. Finally, the actuator is aligned.

Applicant for example offers—among others—an NM230-F form-fit damper actuator. This actuator has a hollow shaft, which is placed over the 8 mm square spindle of a damper and secured by two screws.

The disadvantages of this well-known actuator-control unit interface are the following:
It requires a lot of space;
It requires a careful alignment;
It requires the use of special tools;
It requires the application of various fixing materials.

SUMMARY OF THE INVENTION

It is an object of the invention, to provide a control device, which avoids the drawbacks of known devices, can be easily assembled without using tools or fixing material, and is applicable in situations, where the space is limited.

According to the invention a control device comprises a control unit with a control element for controlling a fluid flow and being rotatable about a first axis between an open position and a closed position, and further comprises a separate, attachable motor-driven actuator unit, which is mechanically coupled to said control unit to rotate said control element about said first axis in a controllable fashion, whereby said actuator unit comprises a driving part with a driving element being rotatable about a second axis, to be mechanically coupled to said control element in a coupling position to rotate said control element about said first axis, and a control part for driving said driving element in a controllable fashion.

It is characterized in that said driving element is coupled to said control unit by means of a spur gearing (Hirth serration).

According to an embodiment of the invention said control element is provided with a first spur gearing, said driving element is provided with a second spur gearing being complementary to said first spur gearing, and in said coupling position of said control unit and said actuator unit said first and second axes are in coaxial alignment, whereby said first and second spur gearings are engaged with each other in a non-rotatable fashion.

Specifically, said first and second spur gearings are held in said coupling position by holding means provided on said control unit.

Said holding means may comprise a spring, which axially presses said first and second spur gearings against each other.

More specifically, said spring is configured to receive said driving part of said actuator unit and to be tensioned by said driving part, when said actuator unit is brought into said coupling position in a movement perpendicular to said first and second axes.

Alternatively, said holding means may comprise lateral latching guides, which catch and hold said actuator unit, such that said first and second spur gearings are held in said coupling position.

Furthermore, an actuator receptacle is provided on said control unit, which receives and guides said actuator unit, when it is brought into said coupling position in said movement perpendicular to said first and second axes.

Specifically, said actuator receptacle comprises a rectangular box with two parallel side walls, a rear wall and a bottom, which box is open at its front side to receive said actuator unit in a sliding fashion, when it is brought into said coupling position.

More specifically, said actuator unit has two parallel side cheeks which abut against said side walls of said box, when said actuator unit laterally slides into said box in order to be brought into said coupling position.

Even more specifically, said box is open at the top, and that said spring extends into said open top essentially parallel to said bottom with a resilient latching section.

Furthermore, said resilient latching section of said spring is provided with an opening, which receives in a latching action a latching element provided on said driving part of said actuator unit, when said actuator unit laterally slides into said box in order to be brought into said coupling position.

Alternatively, said actuator receptacle may comprise a bottom plate, which receives said actuator unit in a sliding fashion, when it is brought into said coupling position, a rear wall acting as a stop for said actuator unit, and opposite lateral latching guides, which guide said actuator unit laterally and keep it in said coupling position.

Especially, said first spur gearing of said control element extends into said actuator receptacle through an opening in a bottom of said actuator receptacle.

In addition, a sliding ridge is provided on the bottom of said box for lifting said actuator unit against the resilient latching section of said spring, when said actuator unit slides into said box in order to be brought into said coupling position.

Alternatively, a sliding ridge is provided on said bottom plate of said actuator receptacle, whereby said actuator unit is provided with guiding rails, which engage with respective recesses in said sliding ridge in order to prevent rotational motion of said actuator unit about said second axis.

According to another embodiment of the invention said control unit is an air damper or valve of an HVAC system.

BRIEF DESCRIPTION OF THE DRAWINGS

The present invention is now to be explained more closely by means of different embodiments and with reference to the attached drawings.

DETAILED DESCRIPTION OF DIFFERENT EMBODIMENTS OF THE INVENTION

The present invention is based on a new interface design between actuator and control unit (e.g. air damper or valve). This new interface design is self-centering, backlash free and requires no installation tools. Especially, the actuator unit can be designed as a flat unit of small height, which can be used as a space-saving slide-in unit to be laterally plugged into a slot-like opening to automatically couple with said control unit.

Figure 1:
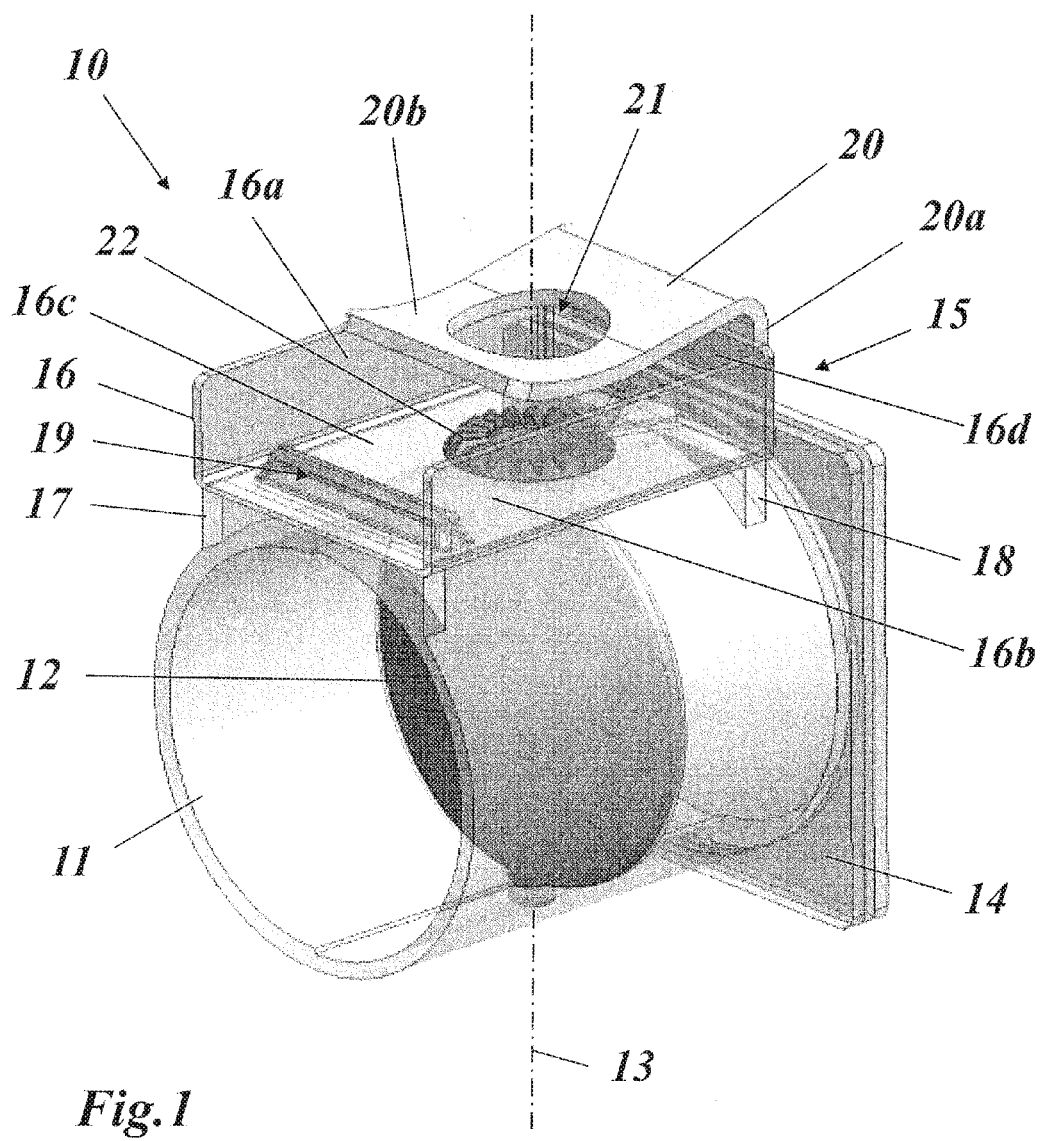
FIG. 1 shows in a perspective view a control unit in form of an air damper according to an embodiment of the invention with the respective actuator unit removed.

FIG. 1 shows in a perspective view a control unit to in form of an air damper according to an embodiment of the invention with the respective actuator unit removed. Control unit 10 of FIG. 1 comprises a disc 22, which is rotatable around an axis 13 within a pipe section 11 between a closed position, where the disc 2 is perpendicular to the pipe axis, and an open position, where the disc 2 is parallel to this axis. Pipe section 11 is connected to wall 14.

Above pipe section 11 an actuator receptacle 15 is mounted, comprising a box 16, which is fixed on pipe section 11 by mans of two parallel feet 17 and 18. Box 16 has a bottom 16c, two parallel sidewalls 16a and 16b, and a rear wall 16d. It has an open front side and an open top. A first spur gearing 22, which is fixed to the shaft of control element 12 concentric with its axis of rotation 13, extends into box 16 through an opening in bottom 16c of said box.

A bent (leaf) spring 20 is fixed with a mounting section to rear wall 16d of box 16 and extends into said open top of box 16 essentially parallel to bottom 16c with a resilient latching section 20b. Resilient latching section 20b is provided with an opening 21, which is concentric with spur gearing 22 and receives in a latching action a latching element (27 in FIG. 2) provided on a driving part (25 in FIG. 2) of an actuator unit (24 in FIG. 2), when said actuator unit 24 slides into box 16 in order to be brought into a coupling position with control unit 10. Just behind open front side of box 16 a sliding ridge 19 is provided on bottom 16c, which extends in a direction perpendicular to the slide-in direction of actuator unit 24 (big arrow in FIG. 2).

Figure 2:
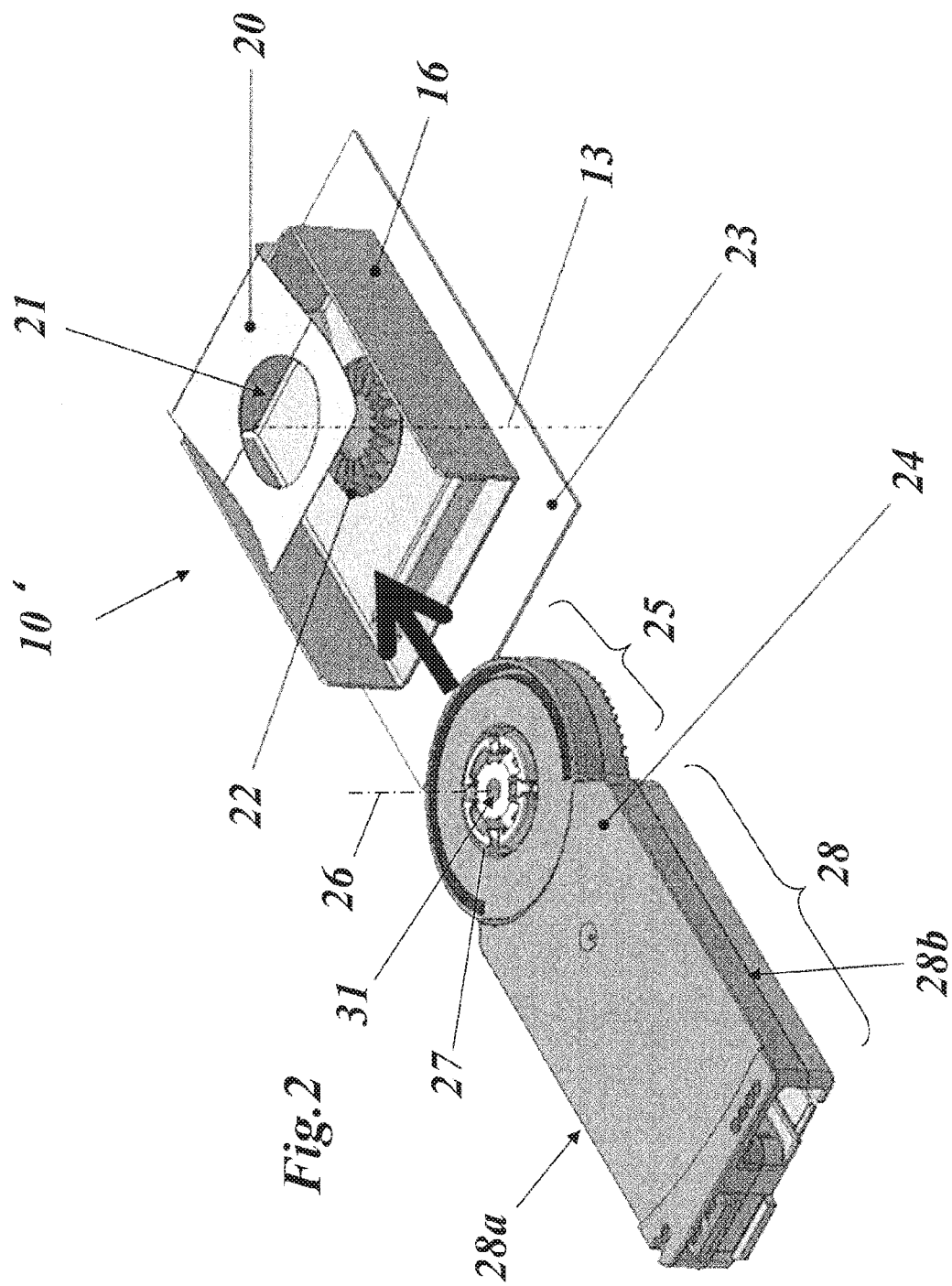
FIG. 2 shows a control unit and a respective actuator unit according to an embodiment of the invention in a position to be connected by sliding the actuator unit into the receiving box.

As shown in FIG. 2, actuator unit 24 comprises a flat rectangular control part 28 containing the motor (not shown) and respective control circuitry, and a flat circular driving part 25 of the same height, with a driving element 31 driven by the motor to rotate around axis 26. Furthermore, driving part 25 is equipped on its upper side with circular latching element 27 designed to latch into opening 21 of spring 20, when actuator unit 24 slides into box 16 of control unit 10' with damper box 23. On its lower side, driving element 31 bears a concentric second spur gearing (29 in FIG. 3), which is designed to match with first spur gearing 22 in a self-centering way.

Figure 3:
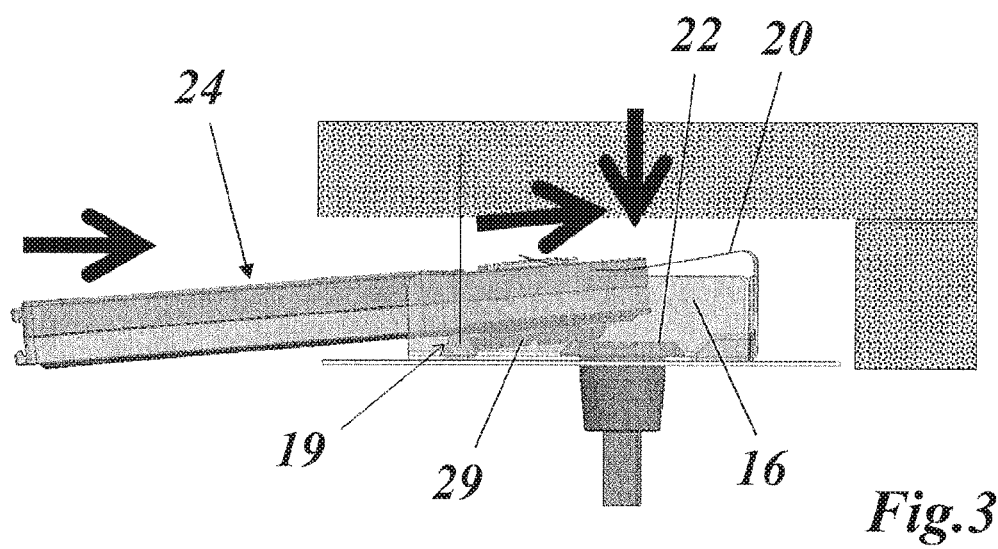
FIG. 3 shows the control unit and actuator unit of FIG. 2 in a position, where the actuator unit tensions the spring at the box just before both spur gearings are coaxially coupled.
Figure 4:
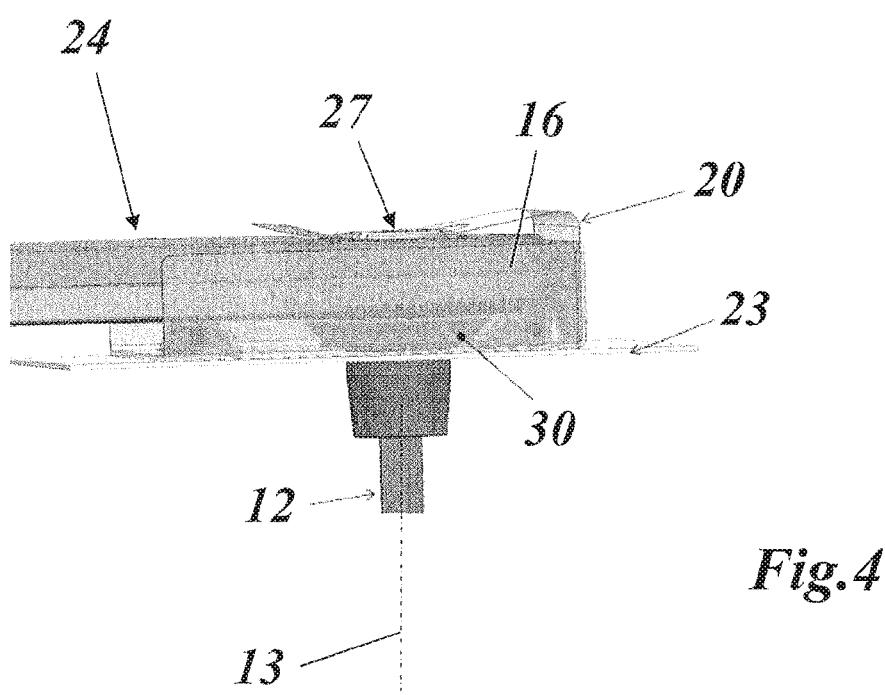
FIG. 4 shows the actuator unit and control unit of FIGS. 2 and 3 in their final coupled position.

Thus, the actuator unit 24 can be slid into a position along the pipe axis (FIG. 3) until it reaches the end stop (rear wall 16d) of the pocket or box 16 (FIG. 4). A slight tilt on sliding ridge 19 pushes latching section 20b up so that upper spur gearing 29 can easily slide over lower spur gearing 22 (FIG. 3). At the end stop the vertical spring clamp/leaf spring 20 pushes the actuator unit 24 with its spur gearing 29 down onto spur gearing 22 and positions the drive teeth. The spring clamp 20 provides enough pressure in order to hold the assembly together during operation. In addition, it absorbs axial forces. The spur gearings 22 and 29 can be wedge-shaped or with grooved-plan side. The spur gearing is also known as Hirth serration.

The spur gearing 22 sits on the control element shaft and is made of plastic or free flowing pressed in steel. The counterpart 29 is snapped into the actuator unit 24 and intervenes in the opposing teeth applied to. Spring element 20 keeps the actuator after installation in axial position. The side cheeks 28a and 28b of the control part 28 (FIG. 2) are used as torque support, when they abut against side walls 16*a,b* of box 16, when actuator unit 24 slides into its final position in box 16.

In reverse, when the actuator unit 24 shall be removed, it must be slightly tilted upwards in order to decouple spring 20 and latching element 27. Then, unit 24 can be unplugged from box 16.

Figure 5:
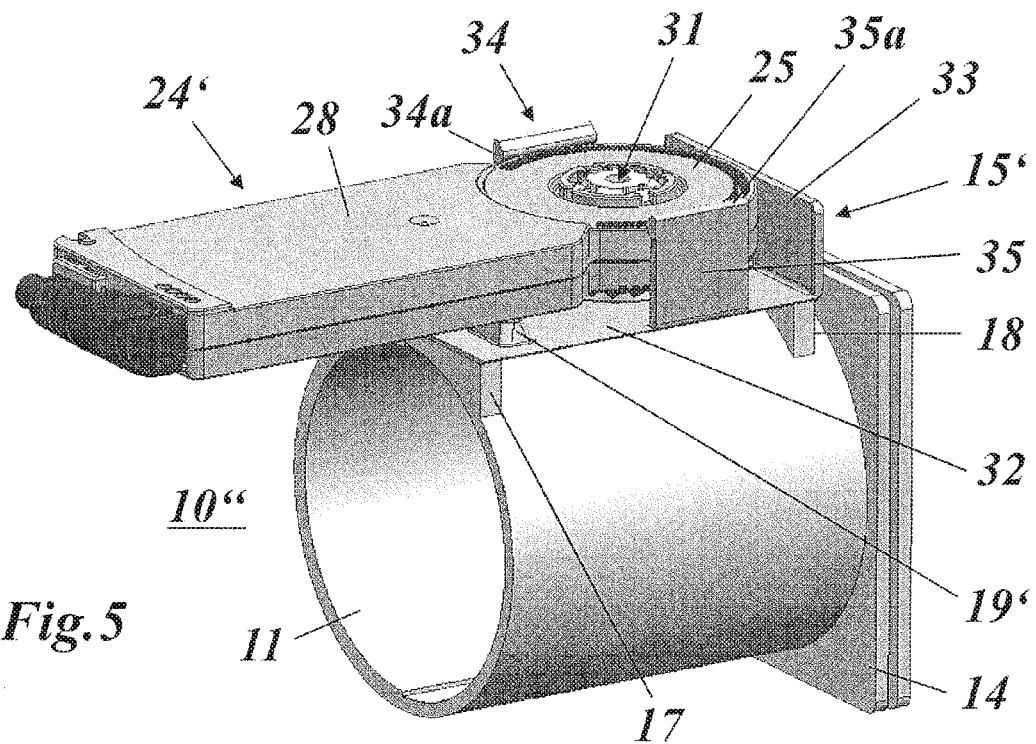
FIG. 5 shows a control unit and a respective actuator unit according to another embodiment of the invention in a final position, where the actuator unit is coupled with the control unit.
Figure 6:
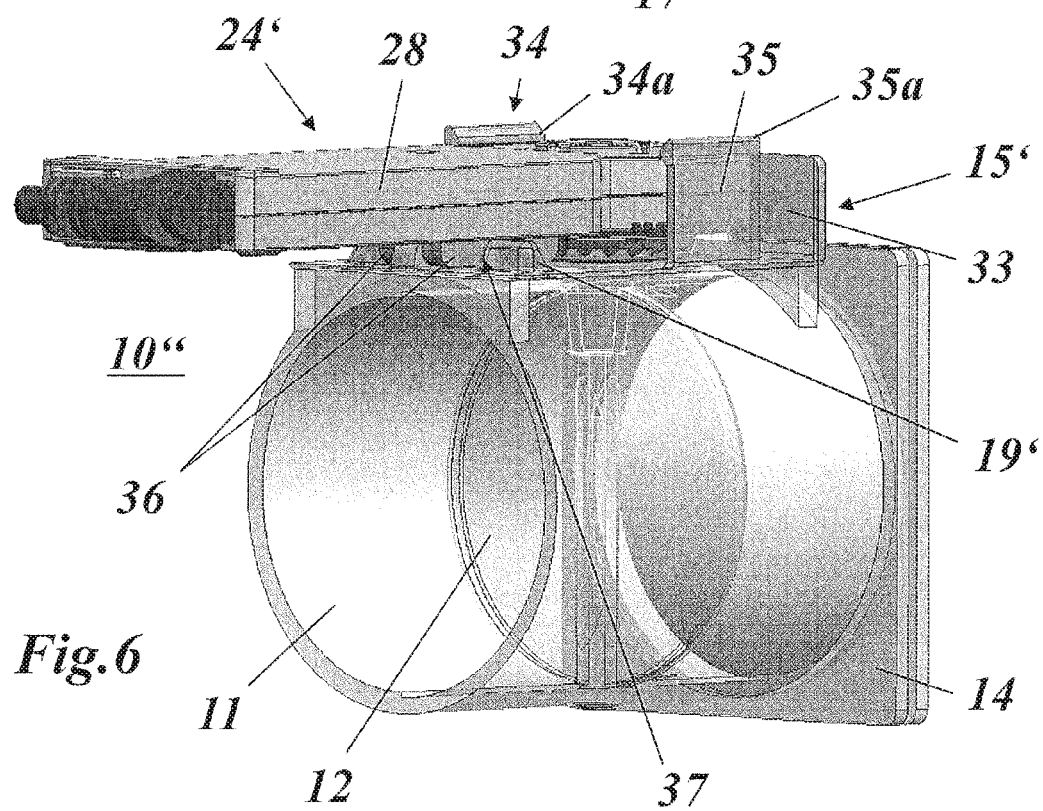
FIG. 6 the arrangement of FIG. 5 in a different perspective.

Another embodiment of a control device according to the invention is shown in FIG. 5 and FIG. 6. In this embodiment, control unit 20" is provided with a actuator receptacle 15' comprising a bottom plate 32, a rear wall 33, two lateral latching guides 34 and 35, and a sliding ridge 19' on bottom plate 32, that has to (parallel) recesses 37 (FIG. 6). Rear wall 33 acts as a stop for the actuator unit 24', when it is plugged into its coupling position.

Latching guides 34 and 35 laterally guide actuator unit 24' during the sliding step. Furthermore, they catch driving part 25 in a clamping fashion at its upper edge with their upper, inwardly extending rims 34*a* and 35*a*.

To prevent a rotational motion of actuator unit 24' about the axis of rotation of its driving element 31, the sliding ridge 19', which is provided on bottom plate 32 has two parallel recesses 37, which receive respective guiding rails 36 on the lower side of actuator unit 24'.

Such an arrangement is space saving, self-centering, form fitting and the space-saving construction brings enormous and cost-effective benefits. Another advantage of such an arrangement is that it comes out without more fasteners and therefore in niches or in very confined spaces can be inserted blindly, whereby the coupling is automatically effected, when the actuator unit slides into the actuator receptacle.

Characteristic features are:

The spring (clip) 20 requires only approx. 3 mm stroke (tooth depth);
self-centering and backlash-free;
space-saving;
It requires no alignment;
A sheet metal or plastic tray (box) with integrated leaf spring is used for axial force absorption and as torque support;
The assembly is done with a lateral push and let go, ready for installation without further fixing material;
It is especially useful for HVAC actuators, for installation in niches or tight spaces;
It is especially useful for HVAC actuators for residential application;
It is especially useful for zone solutions.

LIST OF REFERENCE NUMERALS

10,10' control unit (e.g. air damper or valve)
20" control unit (e.g. air damper or valve)
11 pipe section
12 disc
13 axis
24 wall
15,15' actuator receptacle
16 box
16*a,b* side wall (box)
16*c* bottom (box)
16*d* rear wall (box)
17,18 foot
19,19' sliding ridge
20 spring
20*a* mounting section
20*b* latching section (resilient)
21 opening
22,29 spur gearing (Hirth serration)
23 damper box
24,24' actuator unit
25 driving part
26 axis
27 latching element
28 control part
28*a,b* side cheek
30 coupling
31 driving element
32 bottom plate
33 rearwall
34,35 latching guide
34*a*,35*a* upper rim
36 guiding rail
37 recess

The invention claimed is:

1. A control device (10, 10', 10"; 24, 24') comprising:
a control unit (10, 10', 10") with a control element (12) for controlling a fluid flow and being rotatable about a first axis (13) between an open position and a closed position,
a separate, attachable motor-driven actuator unit (24, 24'), which is mechanically coupled to said control unit (10, 10', 10") to rotate said control element (12) about said first axis (13) in a controllable fashion,
whereby said actuator unit (24, 24') comprises a driving part (25) with a driving element (31) being rotatable about a second axis (26), to be mechanically coupled to said control element (12) in a coupling position to rotate said control element (12) about said first axis (13), and a control part (28) for driving said driving element (31) in a controllable fashion,
wherein said driving element (31) is coupled to said control unit (10, 10', 10") by means of a spur gearing (Hirth serration) (22, 29),
wherein said control element (12) is provided with a first spur gearing (22), that said driving element (31) is provided with a second spur gearing (29) being complementary to said first spur gearing (22), and that in said coupling position of said control unit (10, 10', 10") and said actuator unit (24, 24') said first and second axes (13, 26) are in coaxial alignment, whereby said first and second spur gearings (22, 29) are engaged with each other in a non-rotatable fashion, and
wherein said first and second spur gearings (22, 29) are held in said coupling position by holding means (20; 34, 35) provided on said control unit (10, 10', 10").

2. The control device as claimed in claim 1, wherein said holding means (20; 34, 35) comprises a spring (20), which axially presses said first and second spur gearings (22, 29) against each other.

3. The control device as claimed in claim 2, wherein said spring (20) is configured to receive said driving part (25) of said actuator unit (24) and to be tensioned by said driving part (25), when said actuator unit (24) is brought into said coupling position in a movement perpendicular to said first and second axes (13, 26).

4. The control device as claimed in claim 1, wherein said holding means (20; 34, 35) comprises lateral latching guides (34, 35), which catch and hold said actuator unit (24'), such that said first and second spur gearings (22, 29) are held in said coupling position.

5. The control device as claimed in claim 1, wherein that an actuator receptacle (15, 15') is provided on said control unit (10, 10'), which receives and guides said actuator unit (24, 24'), when it is brought into said coupling position in said movement perpendicular to said first and second axes (13, 26).

6. The control device as claimed in claim 5, wherein said actuator receptacle (15) comprises a rectangular box (16) with two parallel side walls (16a,b), a rear wall (16d) and a bottom (16c), which box (16) is open at its front side to receive said actuator unit (24) in a sliding fashion, when it is brought into said coupling position.

7. The control device as claimed in claim 6, wherein said actuator unit (24) has two parallel side cheeks (28a,b) which abut against said side walls (16a,b) of said box (16), when said actuator unit (24) laterally slides into said box (16) in order to be brought into said coupling position.

8. The control device as claimed in claim 7, wherein said box (16) is open at the top, and that a spring (20) extends into said open top essentially parallel to said bottom (16c) with a resilient latching section (20b).

9. The control device as claimed in claim 8, wherein said resilient latching section (20b) of said spring (20) is provided with an opening (21), which receives in a latching action a latching element (27) provided on said driving part (25) of said actuator unit (24), when said actuator unit (24) laterally slides into said box (16) in order to be brought into said coupling position.

10. The control device as claimed in claim 5, wherein said actuator receptacle (15') comprises a bottom plate (32), which receives said actuator unit (24') in a sliding fashion, when it is brought into said coupling position, a rear wall (33) acting as a stop for said actuator unit (24'), and opposite lateral latching guides (34, 35), which guide said actuator unit (24') laterally and keep it in said coupling position.

11. The control device as claimed in claim 5, wherein said first spur gearing (22) of said control element (12) extends into said actuator receptacle (15, 15')) through an opening in a bottom (16c; 32) of said actuator receptacle (15, 15').

12. The control device as claimed in claim 8, wherein a sliding ridge (19) is provided on the bottom (16c) of said box (16) for lifting said actuator unit (24) against the resilient latching section (20b) of said spring (20), when said actuator unit (24) slides into said box (16) in order to be brought into said coupling position.

13. The control device as claimed in claim 10, wherein a sliding ridge (19') is provided on said bottom plate (32) of said actuator receptacle (15'), that said actuator unit (24') is provided with guiding rails (36), which engage with respective recesses (37) in said sliding ridge (19') in order to prevent rotational motion of said actuator unit (24') about said second axis.

14. The control device as claimed in claim 1, wherein said control unit (10, 10') is an air damper or valve of an HVAC system.

* * * * *